United States Patent
Reichmann et al.

(12) 
(10) Patent No.: US 6,362,806 B1
(45) Date of Patent: Mar. 26, 2002

(54) PROCESS FOR DRIVING AN ELECTROCHROMIC ELEMENT

(75) Inventors: Peter Reichmann, Gelsenkirchen; Jens Cardinal, Bochum, both of (DE)

(73) Assignee: Pilkington Deutschland AG, Gelsenkirchen (DE)

(*) Notice: Subject to any disclaimer, the term of this patent is extended or adjusted under 35 U.S.C. 154(b) by 0 days.

(21) Appl. No.: 09/367,549

(22) PCT Filed: Feb. 19, 1998

(86) PCT No.: PCT/DE98/00492

§ 371 Date: Aug. 16, 1999

§ 102(e) Date: Aug. 16, 1999

(87) PCT Pub. No.: WO98/37453

PCT Pub. Date: Aug. 27, 1998

(30) Foreign Application Priority Data

Feb. 20, 1997 (DE) .................................. 197 06 918

(51) Int. Cl.$^7$ ................................................ G09G 3/38
(52) U.S. Cl. ..................................... 345/105; 359/265
(58) Field of Search ............................... 345/105, 106, 345/55; 359/275, 265, 273

(56) References Cited

U.S. PATENT DOCUMENTS

| | | | | |
|---|---|---|---|---|
| 4,367,469 A | * | 1/1983 | Hashimoto | .................. 345/105 |
| 5,231,531 A | | 7/1993 | Defendini et al. | |
| 5,402,144 A | * | 3/1995 | Ripoche | ..................... 345/105 |
| 5,694,144 A | | 12/1997 | Lefrou et al. | |
| 6,222,177 B1 | * | 4/2001 | Bechtel | ....................... 359/265 |

FOREIGN PATENT DOCUMENTS

| | | |
|---|---|---|
| EP | 0 475 847 A | 3/1992 |
| EP | 0 683 419 A | 11/1995 |
| EP | 0 718 667 A | 6/1996 |
| WO | WO 97 28484 A | 8/1997 |

* cited by examiner

*Primary Examiner*—Chanh Nguyen
(74) *Attorney, Agent, or Firm*—Marshall & Melhorn, LLC

(57) ABSTRACT

A process is disclosed for driving an electrochromic element which consists of at least the following layers: a first electrode layer; a first layer in which ions can be reversibly intercalated; a transparent ion-conducting layer; a second layer in which ions can be reversibly intercalated; and a second electrode layer. One of the layers in which ions can be reversibly intercalated is an electrochromic layer and the other layer acts as a counter-electrode to the electrochromic layer. A voltage with values in a redox stability range of the electrochromic layer system is applied to the electrode layers and causes a change in color. The process is characterised in that the current (I) which flows through the electrochromic element is continuously measured. During a starting phase of the change in color, the voltage (U) rises or diminishes continuously to a maximum, predetermined, temperature-dependent end value ($U_{max}$). The extent to which the end value depends on the temperature varies with the model of the electrochromic element, but not with the surface area of the electrochromic element which changes color. During the change in color, the voltage (U) is controlled depending on the current (I) and does not exceed the end value ($U_{max}$).

15 Claims, 5 Drawing Sheets

PROCESS FOR DRIVING AN ELECTROCHROMIC ELEMENT

BACKGROUND OF THE INVENTION

The Invention concerns a method of operating an electrochromic element which consists of at least the following layers:

a first electrode layer;

first layer, in which ions can be reversibly inserted;

a transparent ion-conducting layer;

a second layer, in which ions can be reversibly inserted; and a second electrode layer, where the first and/or the second layer, in which ions can be reversibly inserted, is an electrochromic layer and the other of these layers acts as counter-electrode to the electrochromic layer, and where a voltage is applied to the electrode layers which induces a colour-change process, which voltage possesses values in a redox-stability range of the electrochromic layer system and the current flows through electrochromic element is measured continuously.

1. Field of the Invention

The term colour-change process denotes either forced colouring, that is to say a reduction in transmittance or reflectance of the electrochromic element, in particular in the visible region of the spectrum, or decolouring or bleaching, that is to say increasing the transmittance or reflectance. It can also however consist primarily of a change in the colour location of the transmitted or reflected radiation. Voltage values in a redox-stability range of the electrochromic layer system denotes voltages where the electrochromic layer system consisting of the electrochromic layer, the ion-conductive layer and the layer acting as counter-electrode experiences no or at all events very slight irreversible changes.

The electrochromic element incorporates at least one electrochromic layer, whose colour can be reversibly changed. This is combined as counter-electrode either with another electrochromic layer or with a transparent ion storage layer, which does not change its transparency significantly as a result of the insertion of ions. For the sake of simplicity, the two layers in which ions can be inserted are both designated below as electrochromic layers.

The layers of the electrochromic element mentioned above can also if necessary follow one another with further layers being interposed, such as for example protective layers, insulating layers, optically effective auxiliary layers, reference electrode layers, or the like. At least one of the electrode layers is a transparent layer. If the electrochromic element is to be used as a transparent window element with variable transmittance, the second electrode layer will also be transparent. If, on the other hand, the electrochromic element is to be used as a mirror with variable reflectance, one of the two electrode layers will preferably take the form of an opaque reflection layer of a suitable metal, such as aluminium or silver. It is also possible however to operate with two transparent electrode layers and to provide an additional metal reflection layer. For the sake of simplicity, only electrochromic elements with variable transmittance will be discussed, without however the Invention being restricted to this.

It is possible, by means of the voltage applied via the electrode layers to the electrochromic element, to alter its transmittance. This change generally takes place more quickly, the higher is the voltage applied. Of course, if the electrochromic element is not operated in optimum fashion, if therefore, in particular, the voltage applied is too high, it can be permanently damaged. It is then possible for the transmittance of the electrochromic element to cease being variable, or that the difference between minimum and maximum transmittance will no longer be as great as in undamaged state, under otherwise identical ambient conditions. It is also to be feared that the electrochromic element will no longer colour homogeneously, possibly irreversibly coloured or no longer colourable areas will be formed.

Above all, if a polymer electrolyte is used as ion-conductive layer, there is also a risk of the electrochromic layer delaminating, that is to say that the ion-conductive layer will become detached from the electrochromic layers in some areas.

According to the application of the electrochromic element, it will be exposed to a greater or lesser degree to wide temperature fluctuations. Thus, for example, in the case of an electrochromic element which is used in motor vehicles as window glass, roof glazing panel, or the like, it can be expected that it will operate satisfactorily at temperatures in the range of −20° C. to +80° C. Similar temperatures are to be expected in the case of applications in the outer skin of buildings, for example in the field of building curtain walls. It is known that a temperature increase will lead to reduction of the specific resistance of the system components. In particular, the resistance of the ion-conductive layer can decrease drastically with a temperature increase. If suitable measures are not taken, this can easily lead to the fact that, at high temperatures, the redox stability range of the electrochromic layer system will be exceeded and irreversible changes will occur.

2. Description of the Prior Art

From EP 0 475 847 B1, according to which the Preamble of the Patent Claim is formulated, a process for operating an electrochromic element is known, where the voltage applied to the electrochromic element is temperature-dependent. The temperature is measured directly with a thermometer, or indirectly, by a voltage pulse being generated prior to each colour-change process, by means of which with simultaneous current measurement, the resistance of the ion-conductive layer is determined, and from this the temperature of the electrochromic element is determined. According to the temperature determined, a voltage is applied to the electrochromic element for a predetermined time. When the desired transmittance is reached, the voltage is disconnected.

EP 0 718 667 A1 has as its subject a process for operating an electrochromic element which can be influenced by the user, which process can be adapted via an interface to electrochromic elements of different designs, to the ambient temperature and to the dimensions of the electrochromic element. Here, the voltage with which the electrochromic element is operated is also to be a function of the temperature. A disadvantage of the known process is that, for each individual electrochromic element, matching of the control parameters to the window dimensions must take place.

EP 0 683 419 A1 discloses a method to trigger an electrochromic element in which a current is impressed on this.

SUMMARY OF THE INVENTION

The purpose of the present Invention is to provide a process for operating an electrochromic element which will operate over a wide temperature range, which is largely independent of the area of the electrochromic element, which permits a change in transmittance over a wide range, which permits sufficiently rapid colour change, and with which a long service life of the electrochromic element can be achieved.

This problem is solved by a process in accordance with Patent claim 1. Advantageous configurations are the subject of the Subclaims.

According to the Invention, provision is made for the current I flowing through the electrochromic element to be measured continuously, for the voltage U applied to the electrochromic element during a starting stage of the colour-change process to be increased or reduced continuously up to maximum to a final value $U_{max}$ predetermined as a function of temperature, where the temperature dependence of the final value $U_{max}$ is determined by the design of the electrochromic element, but is independent of the area to be subjected to colour change, and that the voltage U is controlled during the course of the colour-change process as a function of the current I, where the voltage U does not exceed in magnitude the magnitude of the final value $U_{max}$. The final value $U_{max}$ can possess a different magnitude for a colouring process than for a bleaching process.

Current measurements will normally take place regularly at always the same, sufficiently short intervals of time, typically several times a second. It is also possible to proceed in such a way that, for example in the starting stage of the colour-change process, measurements are carried out at shorter intervals than in later stages, because in the starting stage, the current and the voltage will normally change at the fastest rate.

For most applications, it will suffice for the temperature dependence of the final value $U_{max}$ of the voltage U is determined by a linear relationship, for example:

$$U_{max} = A - B \cdot T, \quad (1)$$

where T is the temperature of the electrochromic element, and A and B are constants determined by the design of the electrochromic element, which are to be established empirically. If the temperature T is in ° C., A will correspond in value to the voltage U which may be applied as maximum to the electrochromic element at 0° C. With the constant B is determined to what extent the final value $U_{max}$ of voltage U is to be modified in the event of temperature changes. A and B may be different for a colouring process and a bleaching process respectively. They are characteristic of a certain design of electrochromic element, but independent of its dimensions. They can be established on the basis of cyclic voltammetric preliminary investigations on the electrochromic layers, for example by means of systematic test series, where electrochromic elements of the same design and dimensions are operated with different values of $U_{max}$ at different temperatures, and the maximum voltages in magnitude determined at which the electrochromic elements do not, over a large number of (minimum approximately 1,000–10,000) colour-change cycles, experience any significant deterioration in their colour-change properties.

An essential feature of the Invention is the regulation of the voltage U applied to the electrochromic element as a function of the current I. The Invention utilizes the surprising principle that evaluation of the continuous measurements of the current I renders superfluous any knowledge of the exact dimensions of the electrochromic element for safe operation of this element. The measured values of the current I can basically be utilized in a different fashion for regulation of the voltage U. Thus, for example, provision can be made for the voltage U to be increased in magnitude initially in the starting stage up to the final value $U_{max}$ and subsequently to maintain it at the value reached until the current I falls below a temperature-dependent first threshold referred to the maximum current $I_{max}$ —as explained in detail below—following which the voltage U is reduced in value continuously or in several steps, until the current I reaches a lower switch-off threshold also referred to the maximum current $I_{max}$, dependent on temperature. Advantageously, this current-controlled regulation of the voltage U takes place however with the aid of an arithmetic value for the total resistance $R_{ges}$ of the electrochromic element determined from current and voltage measurements.

The total resistance $R_{ges}$ of the electrochromic element can be determined preferably in the starting stage of the colour-change process from the voltage U and the current I. To compensate for any voltage offset (open-circuit voltages), the total resistance $R_{ges}$ is preferably calculated as the first derivative of the voltage U to the current I. This is obtained in first approximation by the formation of the quotient $\Delta U/\Delta I$ of the magnitudes of voltage difference and current difference at consecutive moments of time $t_i$, $t_{i+1}$, $\Delta U = |U(t_{i+1}) - U(t_i)|$, $\Delta I = |I(t_{i+1}) - I(t_i)|$. The accuracy of the calculation can be increased by averaging being carried out from several quotients $\Delta U/\Delta I$ determined at different points in time. By carrying out the measurements and calculation in the starting stage of the colour-change process, it is possible to a large extent to avoid falsifying the measurement results due to internal voltages occurring during the course of the colour change.

As the total resistance $R_{ges}$ is temperature-dependent, it is basically possible to conclude the temperature T of the electrochromic element from this, if it should be necessary to dispense with separate temperature sensors. Particularly in the case of large-area electrochromic elements, preference should of course be given to direct temperature measurement with the aid of a temperature sensor, on account of the greater degree of accuracy obtained.

Especially long service life of the electrochromic element can be achieved by calculating from the voltage U, the current I and the total resistance $R_{ges}$, a voltage $U_{eff}$ which is effective electrochemically at the electrochromic layers, and by regulating the voltage U such that $U_{eff}$ does not in magnitude exceed a predetermined value $U_{eff,max}$, above which irreversible changes can occur at the electrochromic element. Here, the following Approximation Equation is preferably used to determine the voltage $U_{eff}$ effective electrochemically at the electrochromic layers; how it is arrived at is described below:

$$U_{eff} = U - I \cdot D \cdot R_{ges} \quad (2)$$

where D is a correcting variable, to be used where necessary to compensate for approximation errors. It will suffice in most cases to use the value of 1 for D. To optimize the voltage regulation with a view to maximum possible service life of the electrochromic element, it may however be advantageous to work with a correcting variable D differing from 1, this being determined in orientation trials. Cases are conceivable, for example, where measurement of the total resistance $R_{ges}$ is only carried out at a relatively late stage of a colour-change process, in which the individual resistances of the electrochromic layer system depend to an especially large extent on the colouration state or in which the electrochromic layers possess an unusually high ohmic resistance.

Rapid, but nevertheless careful colour change is achieved by an especially simple method of control if, after completion of the starting stage, and as long as the voltage $U_{eff}$ electrochemically effective at the electrochromic layers does not yet reach the maximum permissible value $U_{eff,max}$ in magnitude, the voltage U is kept essentially constant at the final value $U_{max}$, reached at the end of starting stage. Of course, it could even be possible to operate with voltages U which are lower in magnitude than the final value $U_{max}$. Such a process would however result in longer colour-change times, which is normally undesirable.

A switch-off criterion of the voltage U can, in particular where complete colouring or bleaching is desired, be defined particularly simply according to the Invention with the aid of the maximum current $I_{max}$ which has flowed during the colour-change process. It can thus be determined that the voltage U is switched off when the ratio of instantaneously flowing current I to maximum current $I_{max}$ falls below a specified value which is determined by the design, the type of colour-change process and generally by the temperature T.

If only partial colour change is desired, it is possible for example to monitor the transmittance or the reflectance of the electrochromic element and to switch off the voltage U when the transmittance or reflectance reaches a predetermined value.

Another alternative consists of determining the quantity of electricity which has flowed in the electrochromic element since commencement of the colour-change process and to switch off the voltage U when the quantity of electricity which has flowed reaches a specified value. The quantity of electricity which has flowed can be determined by time integration of the current I.

With the process according to the Invention it is possible, as soon as the design-related parameters A, B, D, $U_{eff,max}$ and the switch-off ratio $I/I_{max}$ have been determined, to carry out self-calibration of the control process, essentially independently of the area of the electrochromic element to be subjected to colour change, which will permit safe operation of the electrochromic element. It lies within the scope of the Invention however, for the purpose of refining and further optimizing the control process to define various size classes for electrochromic elements, within which in each case the same design-dependent parameters are applied, for example in increments of approximately 0.5 to 1 meter, referred to the shortest element dimension.

The process according to the Invention permits, with a simple method of control, rapid, reproducible and uniform colour change of electrochromic elements, where additional switch-off criteria can be applied for partial colour change. In practical form, it is determined decisively by its starting stage, in which self-calibration is carried out, that is to say in which essential control parameters of the process are determined.

BRIEF DESCRIPTION OF THE DRAWINGS

The Invention will be explained in detail with the aid of the enclosed Drawings. These show.

DESCRIPTION OF THE PREFERRED EMBODIMENT

Figure 1:
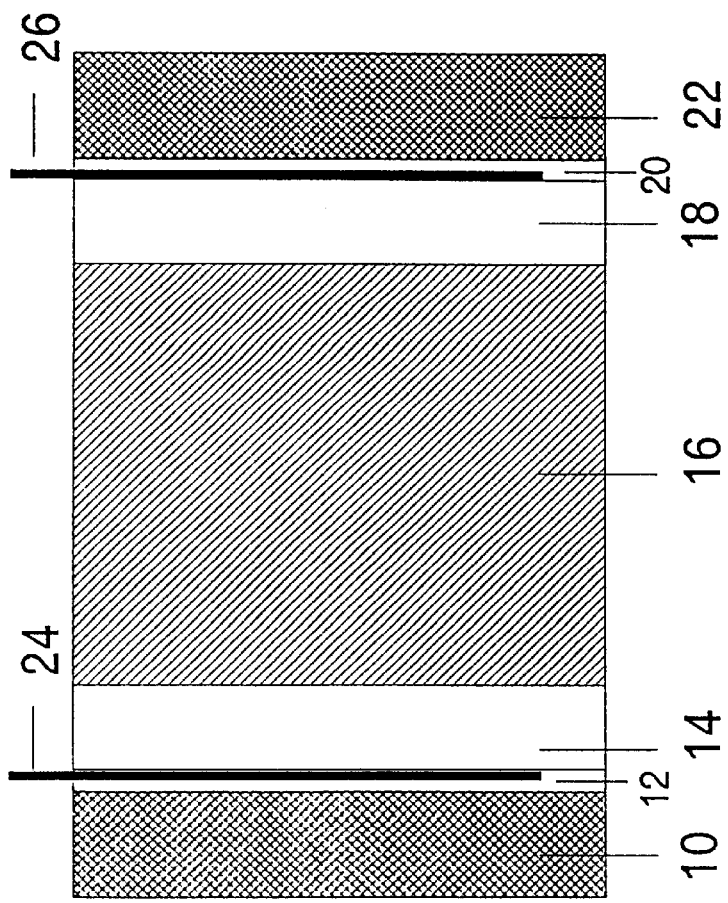
FIG. 1 the diagrammatic construction of an electrochromic element.

FIG. 1 illustrates in diagrammatic form the construction of a specimen electrochromic element. On a glass substrate 10 is located a first transparent electrode layer 12, on which as first layer, in which ions can be reversibly inserted, is provided an electrochromic layer 14. A transparent ion-conductive layer 16, which may take the form of polymer electrolyte, separates the electrochromic layer 14 from the second layer, in which ions can be reversibly inserted, here an ion storage layer 18 which acts as counter-electrode to the electrochromic layer 14. The ion storage layer 18 can take the form of a layer with transmittance essentially independent of the insertion state. It can however possess more or less pronounced electrochromic properties. Layers 14, 18 are designated for the sake of simplicity as electrochromic layers 14, 18, without the field of use of the process according to the Invention being restricted to electrochromic elements with layers capable of changing their colour.

The layer construction is symmetrically supplemented by a second transparent electrode layer 20 and a glass plate 22. The electrode layers 12 and 20 are provided with electrical connections 24, 26, to which a control voltage U can be applied via supply leads which are not illustrated. The electrochromic layer 14 and the ion storage layer 18 consist of materials which are known and suitable for this purpose, as are described for example in EP 0 475 847 B1, in which cations can be reversibly inserted, in particular protons or $Li^+$ions, where the electrochromic layer 14 assumes differing degrees of colouring according to the insertion state.

The voltage U applied to the electrochromic element must fulfil two conditions during the entire process of colour change:

(I) The magnitude of the voltage U may not exceed the magnitude of a specified final value $U_{max}$ dependent on the temperature T. The temperature dependence of this final value $U_{max}$ is dependent of the design of the electrochromic element and is determined primarily by the material used for the electrochromic layers 14, 18 and for the ion-conductive layer 16.

(II) The voltage $U_{eff}$, which is effective electrochemically at the electrochromic layers 14, 18 may not exceed a certain value $U_{eff,max}$. As the potentials prevailing on the electrochromic layers 14, 18 can only be influenced indirectly and only recorded at considerable expense, the voltage U applied to the electrochromic element is preferably regulated on the basis of the total resistance $R_{ges}$ determined in the starting stage of the colour-change process and by evaluation of the continuous measurements of the current I in such a way that condition (II) is complied with at all times. The maximum permissible magnitude $U_{eff,max}$ of the voltage $U_{eff}$ effective electrochemically at the electrochromic layers 14, 18 generally depends on different parameters, that is to say for example on the temperature T of the electrochromic element, on its design and on the nature of the colour-change process (colouring or bleaching).

The voltage $U_{eff}$ effective electrochemically at the electrochromic layers 14, 18 is reduced in magnitude in relation to the voltage U applied externally to the electrochromic element, that is to say by the ohmic losses at the various other components of the electrochromic element including its supply leads. The voltage $U_{eff}$ is in fact not accessible for direct measurement with an electrochromic element producible at an industrially viable cost. It can however be calculated approximately with sufficient degree of accuracy, as described below.

Figure 2:
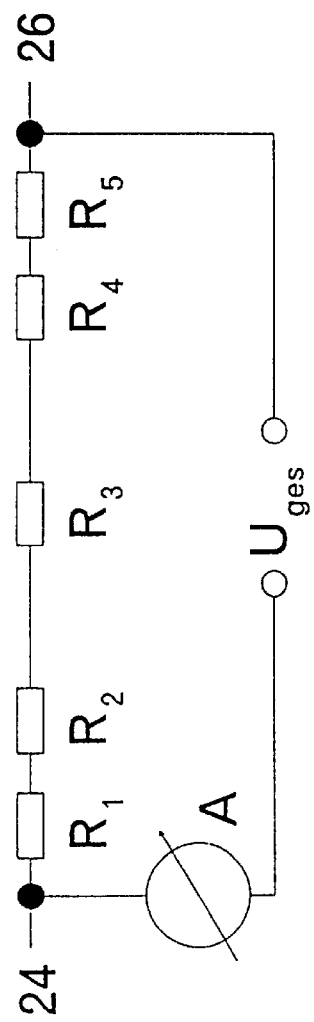
FIG. 2 a simplified equivalent circuit diagram of the electrochromic element of FIG. 1.

FIG. 2 shows a simplified equivalent circuit diagram of the electrochromic element according to FIG. 1. Here, $R_1$ is the ohmic resistance of the electrode layer 12 including connection 24, as well as any supply leads not illustrated, $R_2$ the ohmic resistance of electrochromic layer 14, $R_3$ the ohmic resistance of the ion-conductive layer 16, $R_4$ the ohmic resistance of the ion storage layer 18 and $R_5$ the ohmic resistance of the electrode layer 20, including connection 26 as well as any supply leads not illustrated.

The total resistance $R_{ges}$ of the electrochromic element is thus obtained as the total of resistances $R_1$ to $R_5$, $$R_{ges} = R_1 + R_2 + R_3 + R_4 + R_5.$$

With the current I flowing through the electrochromic element, one obtains therefrom the applied voltage $U = I \cdot R_{ges}$, where the voltage components $I \cdot R_2 + I \cdot R_4$ dropping across the electrochromic layers 14, 18 correspond to the previously mentioned electrochemically effective voltage $U_{eff}$. It is therefore true to say that:

$$U = U_{eff} + I \cdot (R_1 + R_3 + R_5)$$

or—resolved according to $U_{eff}$—:

$$U_{eff} = U - I \cdot (R_1 + R_3 + R_5). \quad (3)$$

From this Equation (3) it is possible, assuming that in any case in the starting stage of the colour-change process, the resistances $R_2$ and $R_4$ are small in relation to $R_1 + R_3 + R_5$, with $R_{ges} \approx R_1 + R_3 + R_5$ to derive the Approximation Equation (2) stated above.

From Equation (3) or Approximation Equation (2) it can be deduced directly that the voltage $U_{eff}$ effective electrochemically at the electrochromic layers 14, 18 can be regulated by means of voltage U and with the aid of measurement of the current I. The value of $U_{eff}$ calculated in this way can of course only be an approximate value, as the voltage drop $I \cdot R$, in particular in the case of large-area electrochromic elements is not constant over the entire area of the element, but is greatest at the edges, whilst it assumes a minimum value at its centre. The resistance characteristic of an electrochromic element is described correctly in physical terms by means of complex variables (impedances). The determination of complex impedances however requires comparatively complex instrumentation, which is not justified in terms of cost-effectiveness. It has been found that in practice, for determination of the required operating parameters of the control process, merely taking account of the ohmic part of the impedances of the system components will provide a quite adequate approximate value.

From the two above-mentioned conditions (I) and (II), which are to be maintained during operation of the electrochromic element in a redox-stability range of the electrochromic layer system, in combination with Approximation Equation (2) for each moment in time of the colour-change process, two upper limits are determined for the magnitude of the voltage U to be applied to the electrochromic element, neither of which may be exceeded:

$$|U| \leq |U_{eff}| \quad (4)$$

$$|U| \leq |U_{eff,max} + I \cdot D \cdot R_{ges}| \quad (5)$$

The voltage U is regulated by evaluation of the continuous measurements of the current I so that the lower of the upper limits obtained from the Relations (4) and (5) is not exceeded in magnitude.

In order to initiate a colour-change process, a voltage U is applied to the electrical connections 24 and 26 (FIG. 1) of the electrochromic element, this voltage proceeding from a measurable open-circuit voltage $U_{EC}$ with the electrochromic element in zero-current state. The voltage U is now—according to the type of process desired —increased or decreased, increase or decrease taking place continuously, but need not necessarily proceed linearly. Of course, according to the sign of the open-circuit voltage $U_{EC}$, initially zero crossing of the voltage U can take place, where therefore the magnitude of the voltage U will initially drop, before finally an increase in the voltage magnitude will take place. The increase in the voltage magnitude and thus the starting stage of the colour-change process will be completed at the latest when the lower of the upper limits according to Relations (4) and (5) is reached.

In the case of the process described here, Relation (4) will normally provide the lower upper limit, whilst the upper limit according to Relation (5) will only come into consideration during the further course of the colour-change process. It can however happen that the increase in the magnitude of the voltage U is completed in the starting stage of the colour-change process as a result of reaching the upper limit according to Relation (5), and thus before reaching the final value $U_{max}$.

During the starting stage of the colour-change process, according to the Invention the total resistance $R_{ges}$ of the electrochromic element is determined as previously defined from the quotient $\Delta U/\Delta I$. Here, a mean value is preferably formed from several individual values of the total resistance $R_{ges}$ determined at different moments in time, in order to increase accuracy of measurement.

During the further course of the process according to the Invention, it is preferable as long as the upper limit according to Relation (5) is higher than that from Relation (4), for the voltage U to be maintained at or close to the final value $U_{max}$. The current I through the electrochromic element generally decreases with time. Thus, the upper limit from Relation (5) decreases as well. This then generally results after a certain period of time in the situation that Relation (5) provides the lower upper limit for the magnitude of the voltage U, so that from then onwards the voltage U is regulated in accordance with Relation (5), that is to say, is generally reduced in magnitude according to the progressive reduction of current I at the end of the colour-change process.

According to the Invention, the current I is also measured continuously after the starting stage in order to ensure observance of Relations (4) and (5) by continuous correction of the voltage U. It is of course permissible to undershoot the upper limits provided, where in respect of magnitude, time duration, frequency of undershoot and the like, there is basically no form of restriction from safety aspects. It should be taken into account at all times that undershoot of the permissible upper limits for the magnitude of the voltage U will extend the times until complete colour change is reached, which is generally undesirable.

Figure 3:
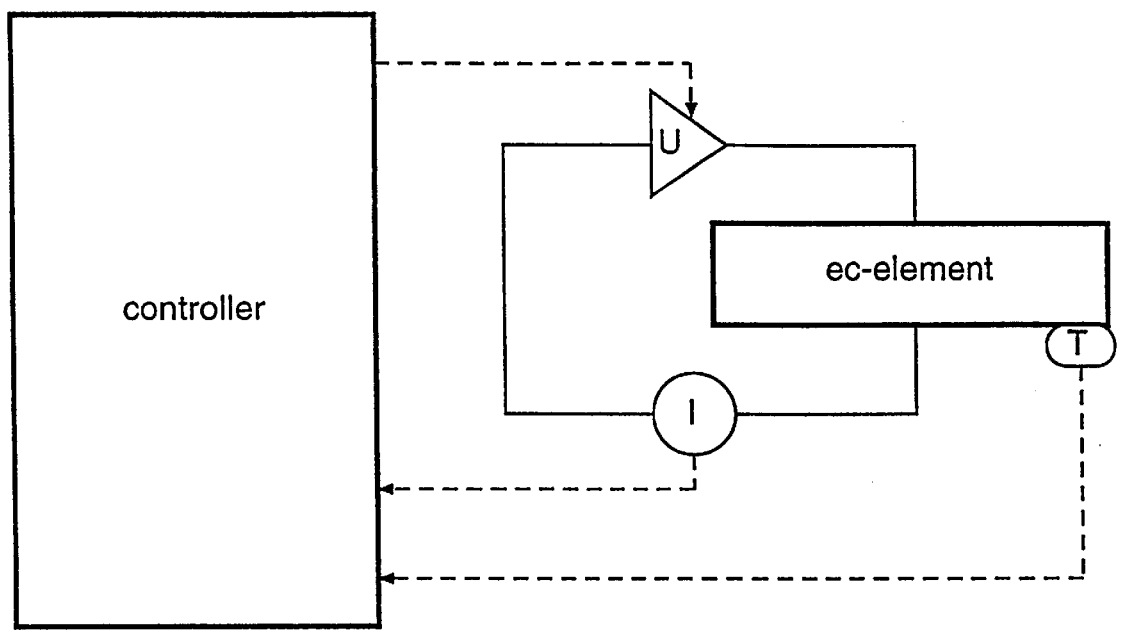
FIG. 3 a diagrammatic block diagram to illustrate the measurement and control variables for operating an electrochromic element according to the Invention.

FIG. 3 shows a highly simplified block diagram to explain the measured and controlled variables in the process according to the Invention for operating an electrochromic element (ec element). The temperature of the electrochromic element is generally established by means of a suitable temperature sensor (designated T), whose measured values are sampled by the controller monitoring and controlling the colour-change process. The temperature sensor can be arranged in a suitable position outside or inside the electrochromic element. Furthermore, the current flowing through the electrochromic element is measured with a measuring instrument designated I and the measured values are passed to the controller. The controller then carries out the calculations as described above and passes the resultant controlled variable to a voltage source (designated U), which in turn applies the adjusted value to the electrochromic element. According to the type of voltage source, either the controlled variable passed to the voltage source can be used directly as a measure of the voltage applied to the electrochromic element, or the latter can be determined with the aid of a separate measuring instrument, which is not illustrated. The controller, the measuring instruments and the voltage source combine to form a control unit for implementing the process according to the Invention. The controller comprises inter alia means for carrying out the necessary calculations (for example a microprocessor) for input and output of measured and controlled variables, and for storage of the control parameters, as well as of other variables, such as for example of the maximum current which has flowed $I_{max}$.

The end of the complete colour-change process is reached when the current I flowing through the electrochromic element falls below a predetermined fraction of the maximum current $I_{max}$ which has flowed since the beginning of the colour-change process. The value of this ratio $I/I_{max}$ serving as a termination criterion is determined by the temperature T and the design of the electrochromic element, as well as the nature of the process taking place, that is to say colouring or bleaching. As the current I is measured continuously during the entire colour-change process, it presents no difficulty in determining a maximum value $I_{max}$ and for storing the termination criterion.

Figure 4:
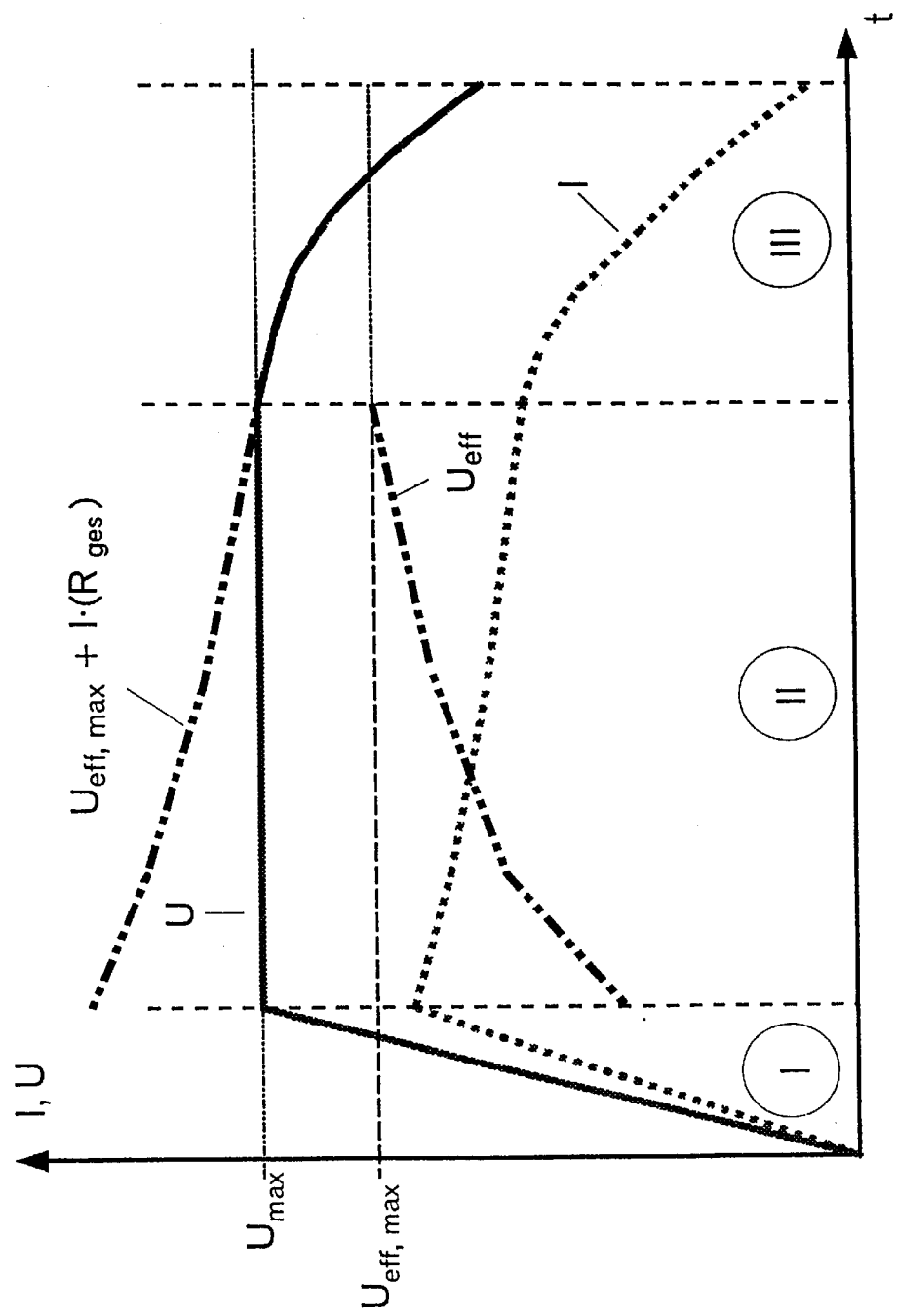
FIG. 4 the diagrammatic characteristic curve of current and voltage when the electrochromic element of FIG. 1 is operated in accordance with a preferred embodiment of the process according to the Invention.

The process according to the Invention in its preferred embodiment can normally be divided into three stages, as illustrated in FIG. 4. The colour-change process commences with the starting stage designated Stage I, in which voltage U and current I are increased or reduced steadily, avoiding voltage or current peaks, until the voltage reached a specified final value $U_{max}$. This is followed by Stage II, in which the voltage remains at the final value $U_{max}$. Generally, Stage II takes the longest time of the colour-change process. Stage III, with current I reducing until it reaches a value corresponding to the termination criterion according to the Invention and voltage U reducing in magnitude, follows as soon as the upper limit of Relation (5) drops below $U_{max}$. In the starting stage, the total resistance $R_{ges}$, which is important for the moment of inception of Stage III and for the time characteristic of the voltage U to be obtained in this stage, is determined. The smooth, steady increase in the current I and of the magnitude of the voltage U in the starting stage also surprisingly ensures an evening out of the degree of colouration over the surface of the electrochromic element.

EXAMPLE

The Invention will be explained in its use for a completely bleached electrochromic element, where, on application of a positive voltage U, a current with positive polarity flows through the element, which leads to colouring of the element. Proceeding from a coloured state of the electrochromic element, a voltage U of negative polarity induces a current I of negative polarity, which leads to bleaching of the electrochromic element.

A suitable control unit, consisting of controller, voltage generator and measuring instruments in accordance with the schematic in FIG. 3 provides the necessary voltages and currents and continuously measures, preferably at regular intervals, the voltage U, the current I and the temperature T. In practice it has proved useful with colour-change times in the minutes range to measure the current I several times per second.

In the example chosen, the electrochromic element is in its bleached state. Between the connections of the electrochromic element, an open-circuit voltage $U_{EC}$ is measurable with the electrochromic element in zero-current state. Proceeding from this open-circuit voltage, a voltage U is applied to the electrochromic element, so that a current I, which leads to colouring of the element, flows. The voltage U is increased steadily and —apart from an initial stage with increasing slope of the current/voltage curve—preferably essentially in a linear relation to time. The current/voltage characteristic is in any case regulated in each case such that no current or voltage peaks occur. During this stage of increase of the voltage U, the values of the voltage applied to the electrochromic element U ($t_i$), U ($t_{i+1}$) are determined at various moments in time $t_i$, $t_{i+1}$. At the same moments in time, the current flowing through the electrochromic element I ($t_i$), I ($t_{i+1}$) is measured in each case. From the pairs of variates:

$$\Delta U=|U(t_i)-U(t_{i+1})|$$

and $$\Delta I=|I(t_i)-I(t_{i+1})|$$

a resistance value $R_{ges}$ ($t_i$, $t_{i+1}$) is determined. As soon as there is a sufficient number of resistance values to permit averaging, but at the latest on reaching the final value $U_{max}$, the arithmetic mean is formed from the individual values $R_{ges}$ ($t_i$, $t_{i+1}$), and thus the total resistance $R_{ges}$ is calculated. The current I flowing through the electrochromic element is measured continuously from the beginning of the colouring process; the maximum value $I_{max}$ measured in this time is stored.

As soon as the voltage U reaches the final value $U_{max}$, the starting stage (Stage I in FIG. 4) is completed. The final value $U_{max}$ is temperature-dependent. A simple relationship of the temperature dependence of the final value $U_{max}$ is obtained from the equation already stated above:

$$U_{max}=A-B \cdot T \quad (1)$$

where T is the temperature. The parameters A and B must be determined in advance for each design of an electrochromic element. They are essentially independent of the area of the electrochromic element.

On reaching the final value $U_{max}$ for the voltage, Stage II commences (FIG. 4), in which the voltage U remains at or below the final value $U_{max}$, if quickest possible colouring is desired. The current I is measured continuously by the control unit during Stage II as well. If at any point in time, a higher value for I is measured than was previously stored for $I_{max}$, the higher value at this point is stored as $I_{max}$. In addition, checking is carried out continuously based on the measured values for the current I, as to whether the upper limit according to Relation (5) is higher than the final value $U_{max}$ currently set for the voltage U. The value used in this Relation (5) for the maximum permissible voltage $U_{eff}$ effective electrochemically at the electrochromic layers 14, 18 is not generally a constant, but varies in a similar fashion to $U_{max}$ as a function of temperature T. When it is found from Relation (5) that the upper limit established has dropped in magnitude below the final value $U_{max}$, Stage II ends.

In the immediately following Stage III, Relation (5) now leads to limitation in magnitude of the voltage U to be applied to the electrochromic element. As the voltage $U_{\it eff}$, which is effective electrochemically at the electrochromic layers 14, 18, can be influenced by means of the voltage U, the voltage U is regulated in Stage III such that $U_{\it eff}$ does not exceed the specified value $U_{\it eff,max}$. The upper limit for the magnitude of the voltage U which is calculatable from Relation (5) is at all times during Stage III lower than the final value $U_{max}$ valid in Stage II as upper limit. As the current I influencing $U_{\it eff}$ according to Approximation Equation (2) varies as a function of time, that is to say normally decreases steadily towards the end of the colour-change process, U must constantly be corrected by the control unit. In the process, the voltage U is preferably adjusted to the upper limit steadily decreasing in magnitude according to Relation (5), in order to minimize the colour-change time. During Stage III, current I is also measured continuously for this purpose. In addition, the measured values for current I are used in this stage to establish when complete colouring is reached. This moment is reached according to the Invention when the current I drops below a specified threshold value in relation to the maximum current $I_{max}$ which has flowed. As soon as the control unit establishes that the end of Stage III has been reached, the voltage is switched off and thus the current flow through the electrochromic element terminated. The threshold value for $I/I_{max}$ generally dependent on temperature is determined by the design of the electrochromic element and by the process in progress (colouring, bleaching) and can be established beforehand by means of orientation trials.

The reverse process of bleaching essentially takes place as described previously. Starting from an open-circuit voltage $U_{EC}$, which normally differs from that at the beginning of the colouring process, the voltage U is steadily reduced in the starting stage, that is to say at its maximum in this case up to a negative final value $U_{max}$, whose magnitude may differ from that for the colouring process. This is followed by Stage II, in which the voltage remains at the final value $U_{max}$ until the upper limit from Relation (5) becomes lower in magnitude than $U_{max}$. In the final stage III, the voltage U increases successively, that is to say decreases in magnitude, until on account of reaching the switch-off criterion, which may differ from that for the colouring criterion, switch-off takes place. The bleaching process is completed, the electrochromic element is again in the same state as at the beginning of the example.

Figure 5:
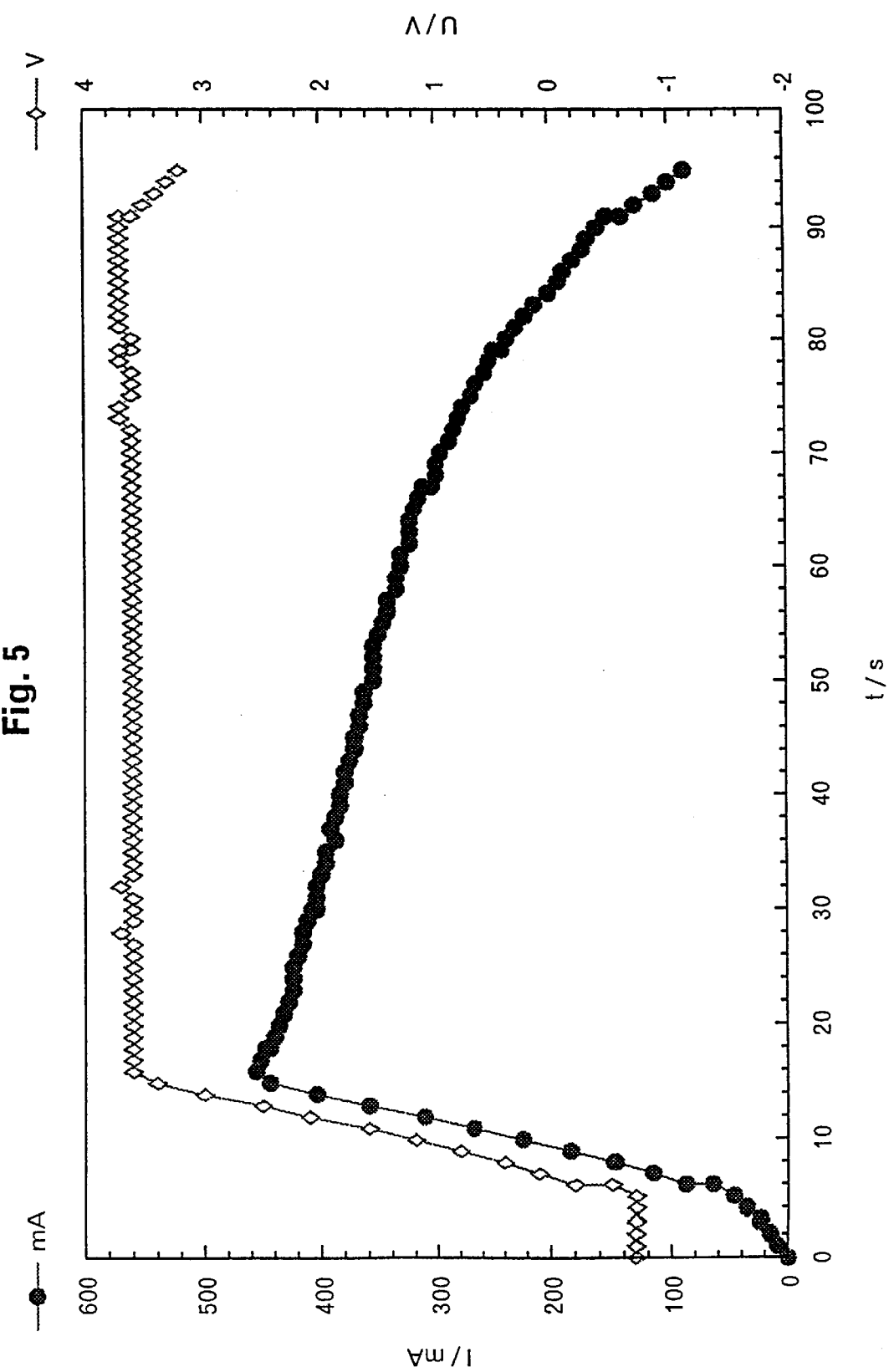
FIG. 5 a measurement curve of the current and voltage characteristic during a colouring process which utilizes a preferred process according to the present Invention, carried out on an electrochromic element with the dimensions 70 cm·100 cm.
Figure 6:
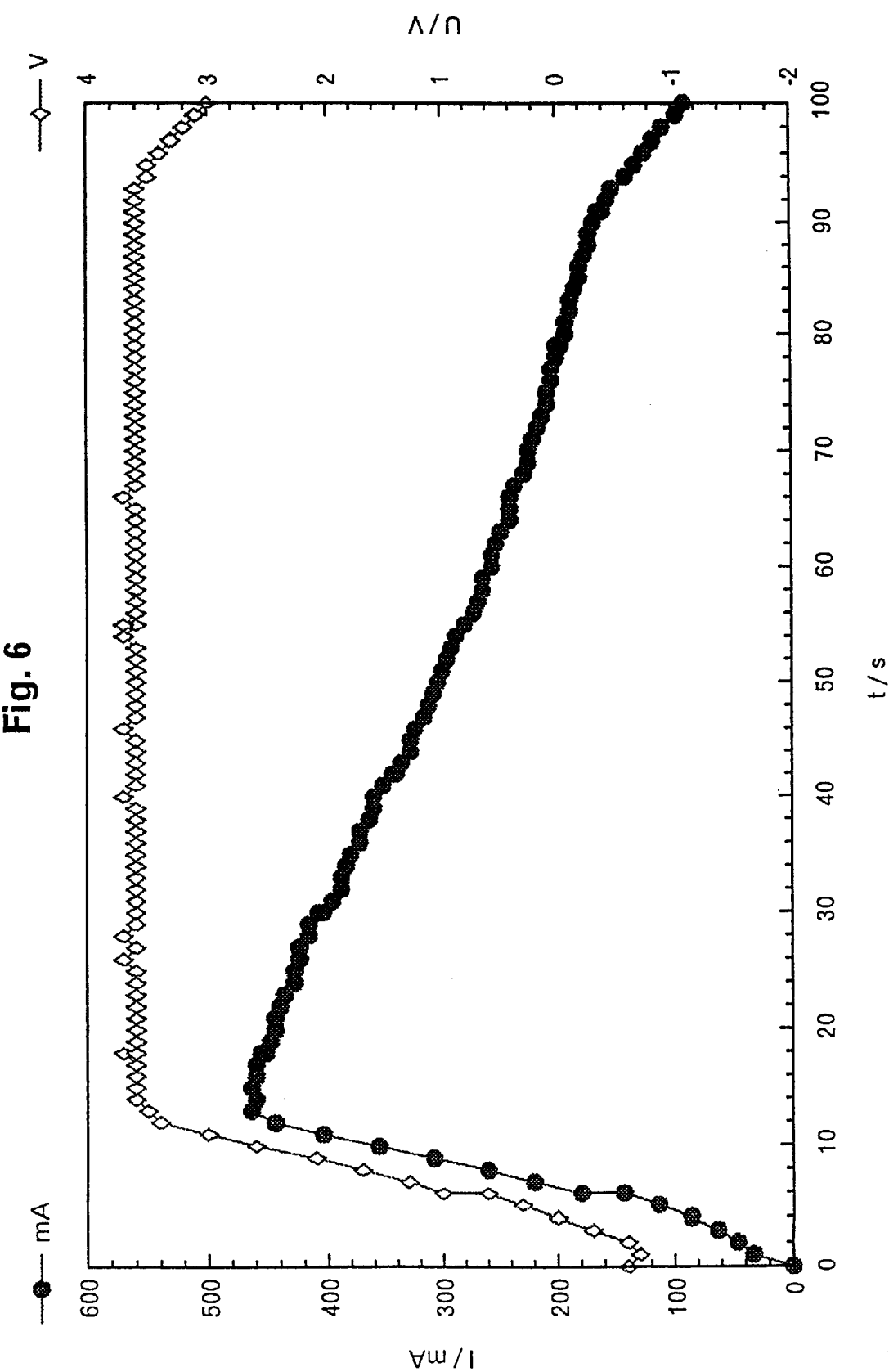
FIG. 6 a bleaching process according to the Invention with an electrochromic element in accordance with FIG. 5.

FIGS. 5 and 6 show for an electrochromic element with the dimensions 70 cm·100 cm the characteristic curve respectively of a complete colouring and bleaching process at room temperature, where the voltage U and the current I have been plotted in each case as a function of the time t. The electrochromic element (see FIG. 1) incorporated two glass substrates 10, 22 provided with transparent electrode layers 12, 20 of ITO (indium tin oxide) with a surface resistance of approximately 10 ohms. On the electrode layer 12 was applied an electrochromic layer 14 of $WO_3$, with a thickness of approximately 300 nm, whilst on the electrode layer 20 was also arranged an approximately 300 nm thick ion storage layer 18 of cerium titanium oxide. As ion-conductive layer 16, a polymer electrolyte according to WO 95/31746 was used, with a thickness of 1 mm. The electrical connections 24, 26 in the form of metal strips were applied along the longer element sides diagonally opposite one another and joined conductively to the corresponding electrode layers 12, 20. The parameters necessary for control according to the Invention of the colouring process and the bleaching process were determined using a series of preliminary tests (cyclic voltammetry, cyclic colour-change at various temperatures over up to 1000 cycles on electrochromic elements of the same design). For $U_{\it eff,max}$, cyclic voltammetric trials for both types of colour-change processes provided magnitudes of 2 V (20° C.) or 1 V (80° C.), from which magnitudes for other temperatures can be determined by linear extrapolation. Proceeding therefrom, the magnitudes of $U_{max}$ at 20° C. as being 3.5 V and at 80° C. as being 2 V were determined with the aid of further systematic tests as described above. This provided the magnitudes of the parameters A and B for Equation (1) as A=4 V and B=0.025 V/° C. (temperature T in ° C.), that is to say $U_{max}$=4 V−0.025 V/° C. ·T for the colouring process and $U_{max}$=−4 V+0.025 V/° C. ·T for the bleaching process. From FIGS. 5 and 6, it can be seen that the voltage U starting in each case from an open-circuit voltage of approximately−0.7 V (colouring) and+0.7 V (bleaching) was steadily increased or respectively reduced, where the starting stage was completed in the case of the colouring process after approximately 16 seconds, and in the case of the bleaching process after approximately 12 seconds by reaching the final value $U_{max}$ of 3.5 V and−3.5 V respectively. The voltage U was subsequently maintained for approximately 75 seconds at this value until the current had reduced to the extent that the upper limit from Relation (5) dropped in magnitude below $U_{max}$. The correction variable D from Relation (5) had the value of 1. In Stage III, the voltage U was adjusted to the gradually decreasing upper limit according to Relation (5). The current I had reached its maximum value $I_{max}$=460 mA in each case at the end of the starting stage. Stage III was completed in both cases when $I/I_{max}$ fell below 20%, which in the case of the colouring process was after approximately 95 seconds and in the case of the bleaching process was after about 100 seconds. At a temperature of 80° C., the switch-off ratio $I/I_{max}$ was 50%.

The features of the Invention disclosed in the Specification, in the Drawing and in the Claims can be essential both individually and in any combination for the implementation of the Invention.

What is claimed is:

1. Process for operating an electrochromic element which consists of at least the following layers:

a first electrode layer;

a first layer in which ions can be reversibly inserted;

a transparent ion-conductive layer;

a second layer in which ions can be reversibly inserted; and a second electrode layer;

where the first and/or the second layer, in which the ions can be reversibly inserted, is an electrochromic layer, and the other of these layers acts as counter-electrode to the other electrochromic layer, and where a voltage is applied to the electrode layers which causes a colour-change process, which possesses values in a redox-stability range of the system, characterized by the fact that the current (I) flowing through the electrochromic element is measured continuously; that in a starting stage of the colour-change process, the voltage (U) applied to the electrochromic element is increased or reduced steadily up to maximum to a final value ($U_{max}$) specified as a function of temperature, where the temperature-dependence is determined by the design of the electrochromic element, but is independent of the area to be subjected to color change; and that the voltage (U) is supplied during the colour-change process as a function of the current (I), where the voltage (U) does not exceed in magnitude the magnitude of the final value ($U_{max}$).

2. Process in accordance with claim 1, characterized by the fact that the temperature-dependence of the final value ($U_{max}$) of the voltage is provided by the equation $$U_{max} = A - B \cdot T$$

where T is the temperature of the electrochromic element, and A and B are constants determined by the design of the electrochromic element.

3. Process in accordance with claim 1, characterized by the fact that the total resistance ($R_{ges}$) of the electrochromic element in the starting stage of the colour-change process is established from the voltage (U) and the current (I).

4. Process in accordance with claim 3, characterized by the fact that the total resistance ($R_{ges}$) of the electrochromic element is established from the quotient $\Delta U/\Delta I$ of the voltage difference ($\Delta U$) and the current difference ($\Delta I$) which are obtained from measurements of voltage (U) and current (I) at consecutive moments in time.

5. Process in accordance with claim 4, characterized by the fact that the total resistance ($R_{ges}$) of the electrochromic element is calculated by averaging of several values of the quotient $\Delta U/\Delta I$ established at different moments in time.

6. Process in accordance with one of claims 3, characterized by the fact that the temperature (T) of the electrochromic element is established from its total resistance ($R_{ges}$).

7. Process in accordance with claim 3, characterized by the fact that from the voltage (U), the current (I) and the total resistance ($R_{ges}$), a voltage ($U_{eff}$) is calculated which is effective electrochemically at the electrochromic layers.

8. Process in accordance with claim 7, characterized by the fact that the voltage ($U_{eff}$) effective electrochemically at the electrochromic layers is calculated according to the equation:

$$U_{eff} = U - I \cdot D \cdot R_{ges}$$

where D is a correction variable dependent inter alia on the layer resistance of the electrochromic element.

9. Process in accordance with claim 7, characterized by the fact that the voltage (U) applied to the electrochromic element is regulated such that the voltage ($U_{eff}$) effective electrochemically at the electrochromic layers does not exceed in magnitude a predetermined value ($U_{eff,max}$).

10. Process in accordance with claim 9, characterized by the fact that as long as the voltage ($U_{eff}$) effective at the electrochromic layers has not reached the maximum permissible value ($U_{eff,max}$) in magnitude, the voltage (U) is kept essentially constant at the final value ($U_{max}$).

11. Process in accordance with claim 1, characterized by the fact that from the measured values determined for the current (I) during the colour change, a maximum current ($I_{max}$) is determined.

12. Process in accordance with claim 11, characterized by the fact that the voltage is switched off when the ratio of instantaneously flowing current (I) to maximum current ($I_{max}$) falls below a previously specified value.

13. Process in accordance with claim 1, characterized by the fact that the transmittance or the reflectance of the electrochromic element is monitored and that the voltage (U) is switched off when the transmittance or reflectance reaches a specified value.

14. Process in accordance with claim 1, characterized by the fact that the quantity of electricity which has flowed through the electrochromic element since the commencement of the colour-change process is established and that the voltage (U) is switched off when the quantity of electricity which has flowed reaches a specified value.

15. Process in accordance with claim 14, characterized by the fact that the quantity of electricity which has flowed is established by integration of the current (I) over time.

* * * * *